J. DUFFEK.
GUN LOCK FOR AUTOMATIC FIREARMS.
APPLICATION FILED AUG. 24, 1920.

1,387,369.

Patented Aug. 9, 1921.
2 SHEETS—SHEET 1.

Inventor
Josef Duffek
By
Attorney

J. DUFFEK.
GUN LOCK FOR AUTOMATIC FIREARMS.
APPLICATION FILED AUG. 24, 1920.
1,387,369.
Patented Aug. 9, 1921.
2 SHEETS—SHEET 2.
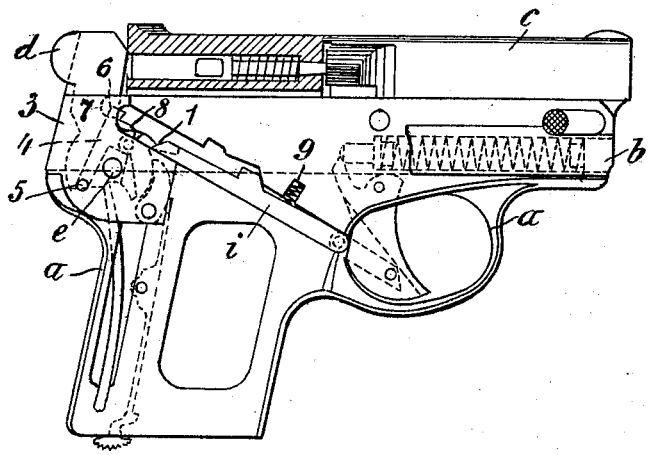
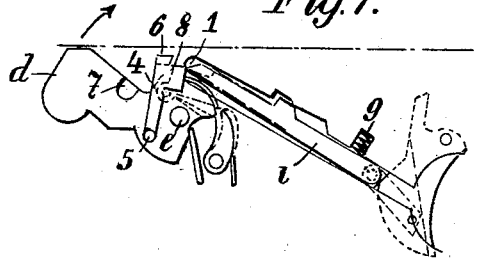
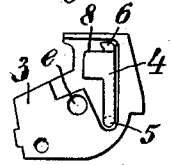
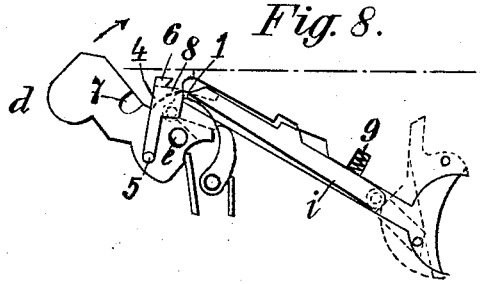
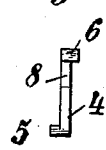
Inventor
Josef Duffek
By
Attorney

UNITED STATES PATENT OFFICE.

JOSEF DUFFEK, OF STEYR, UPPER AUSTRIA, AUSTRIA, ASSIGNOR TO THE FIRM OF OESTERREICHISCHE WAFFENFABRIKSGESELLSCHAFT, OF STEYR, UPPER AUSTRIA, AUSTRIA.

GUN-LOCK FOR AUTOMATIC FIREARMS.

1,387,369. Specification of Letters Patent. Patented Aug. 9, 1921.

Application filed August 24, 1920. Serial No. 405,766.

*To all whom it may concern:*

Be it known that I, JOSEF DUFFEK, a citizen of the Republic of Austria, and residing at Steyr, Upper Austria, Austria, have invented certain new and useful Improvements in Gun-Locks for Automatic Fire-arms, for which I have filed applications as follows: Austria, application for patent filed on May 22nd, 1918; Austria, application for patent of addition filed Febr. 7th, 1919; Hungary, application for patent filed on May 22nd, 1918; Hungary, application for patent of addition filed Febr. 17th, 1919; Germany application for patent filed on May 25th, 1918; Germany, application for patent of addition filed May 13th, 1919; Germany, application for model of utility filed on May 25th, 1918, and on Febr. 13th, 1919; Czechoslovakia, application for patent filed on Aug. 12th, 1918; Czechoslovakia, application for patent of addition filed Sept. 12th, 1919; Switzerland, application for patent filed on April 5th, 1919; France, application for patent filed on May 3rd, 1919; Belgium, application for patent filed on May 3rd, 1919; Italy, application for patent filed on Sept. 7th, 1919; Italy, application for patent of addition filed on Sept. 7th, 1919; Spain, application for patent filed on April 29th, 1919; Holland, application for patent filed on April 28th, 1919, of which the following is specification.

The present invention relates to a gun-lock for automatic fire-arms and essentially consists in that the back-portion of the press-lever, actuated by the trigger and operating the hammer, is provided with a projection, which slides in a guide of the fire-arm-casing on pressing the trigger. The guide terminates in a depression, into which the projection of the press-lever enters, whereby the latter releases the striker which is now caused to jump forward and fire the cartridge by means of the firing pin. Preferably the press-lever is jointed to the trigger by a link, in order to shorten the backward movement of the said trigger.

The accompanying drawings illustrate two preferable constructions of the gun-lock according to the present invention.

Figure 5:
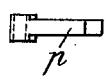

Fig. 5 a plan view of the link.

Fig. 6 shows in part-sectional side-view a modified construction of the piston with the hammer in the uncocked position.

Fig. 7 illustrates diagrammatically the positions of the various parts of this modified gun-lock on cocking the hammer by hand or when firing automatically.

Fig. 8 is a diagrammatic view of the modified gun-lock on cocking the hammer by the trigger.

Fig. 9 illustrates a rear view of the cover-plate with the actuating member, and Fig. 10 a front view of the said member.

Figure 1:
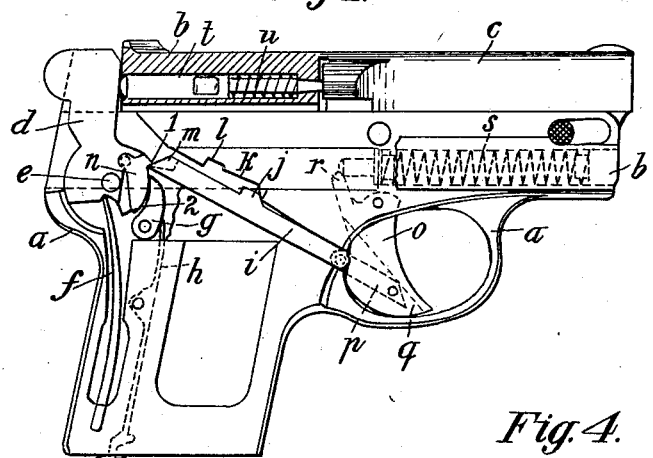
Figure 1 shows in a part-sectional side-view a pistol with the hammer in the uncocked position.
Figure 2:
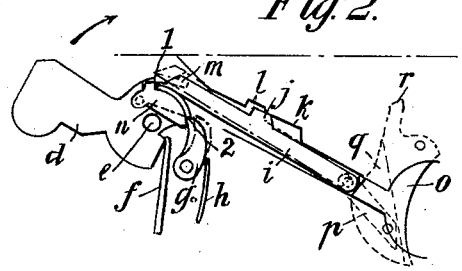
Fig. 2 illustrates diagrammatically the positions of the various parts of the gun-lock on cocking the hammer by hand or when firing automatically.
Figure 3:
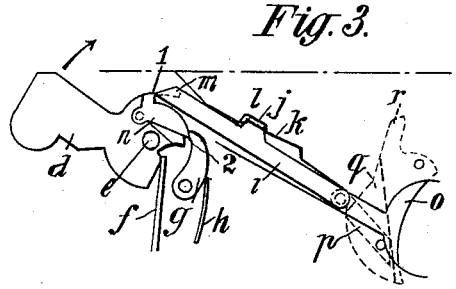
Fig. 3 is a diagrammatic view of the gun-lock, on cocking the hammer by means of the trigger.
Figure 4:
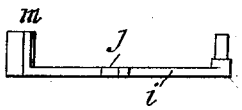
Fig. 4 is a plan-view of the press-lever.

In the construction of the gun-lock, illustrated in Figs. 1–5 the letter $a$ designates the casing of the fire-arm, carrying the breech $b$ and the barrel $c$, $d$ is the hammer pivoted on a pin $e$, secured in the casing $a$, and $f$ the main-spring of the fire-arm. The hammer is provided with two cocking-recesses 1 and 2, the upper recess 1 being released by the trigger on cocking the hammer (Fig. 3), while on cocking the hammer $d$ by hand or when firing automatically, the trigger-pawl $g$ is brought into engagement with the lower recess 2 by the action of a spring $h$ (Fig. 2).

The back of the press-lever $i$ is provided with a projection $j$, which slides in a guide $k$ of the casing $a$. This guide $k$ terminates in a depression $l$, which is entered by the projection $j$ of the press-lever $i$ on releasing the striker $d$. The press-lever $i$ terminates in a cross-arm $m$ which actuates the striker $d$ or a hair-trigger $n$ hinged to the striker. The press-lever $i$ is movably connected to the trigger $o$ by means of a link $p$, arranged in a groove $q$ of the trigger. The trigger $o$ is furnished with an extension $r$, which is acted upon by the solid end of a spring $s$ and returns the trigger to the normal position. The letter $t$ designates the firing pin and $u$ is the firing-pin spring.

The action of the gun-lock is as follows:—On cocking the hammer $d$ by hand or when firing automatically, the hammer is turned down so far, until the spring $h$ will press the trigger-pawl $g$ into the recess 2 of the hammer $d$. The lower arm of the hair-trigger $n$, which latter is hinged to and works in a groove of the hammer, will now lie below the end of the trigger-pawl $g$ and the shorter upper arm of the said small trigger $n$ will be positioned in front of the recess 1 of the hammer $d$.

On pulling the trigger $o$ backward, the press-lever $i$ is caused to move rearwardly by the link $p$ and thereby cause the projection $j$ of the press-lever $i$ to slide in the guide $k$ of the casing $a$. In consequence of this movement the cross-arm $m$ will act against the shorter arm of the hair-trigger $n$ and cause the latter to be rotated about its pivot. Thereby the lower arm of the hair-trigger $n$ will act against the trigger-pawl $g$, lift the latter and disengage the same from the recess 2; this movement being illustrated in dash and dotted lines in Fig. 2. At that movement the recess 1 has reached its final position and the projection $j$ of the press-lever $i$ has entered the depression $l$ of the guide $k$. Thereby the press-lever $i$ is raised, its cross-arm $m$ releases the hammer and the latter jumps forward and strikes the firing pin $t$.

On cocking the hammer by the trigger, the cross-arm $m$ of the press-lever $i$ rests in the recess 1 and against the short arm of the hair-trigger $n$, the latter adapting itself to the shape of the striker. On pulling the trigger $o$ backward, the press-lever $i$ is moved rearwardly by the link $p$ and cocks the hammer $d$. Thereby the projection $j$ of the press-lever $i$ will slide in the guide $k$ of the casing $a$, until the projection $j$ rests in the position illustrated in Fig. 3 and the projection $j$ fully enters the depression $l$. The cross-arm $m$ of the press-lever looses its hold in the recess 1 of the hammer, whereby the latter is disengaged and jumps forward. In this case the hair-trigger $n$ does not come into action.

In the modified construction of the gunlock, illustrated in Figs. 6–10, the rear portion of the casing $a$ is provided with a cover-plate 3 having a suitable hole for the reception of the pivot $e$ of the hammer $d$. Further the cover plate is furnished with a suitable recess for the location of an actuating member 4, which is movable around a pivot 5. The said member 4 is provided with a projection 6, which on firing is operated by a recess 7 of the hammer $d$. Further the member 4 is provided with a forwardly extending extension 8, which is rounded-off at the top. On firing, the projection 8 comes underneath the press-lever $i$, which is forced downward by a spring 9.

The action of the gun-lock is as follows:

On firing the fire-arm, the hammer $d$ jumps forward, the recess 7 of the same will take the member 4 with it by means of the projection 6, whereby the rounded-off extension 8 comes underneath the press-lever $i$, lifts the same and thereby causes an easy and sure disengagement of the press-lever from the recess 1 of the hammer $d$.

What I claim is:

1. A gun-lock for automatic firearms, comprising in combination, a trigger, a press-lever connected to the said trigger, a projection on the press-lever, a guide attached to the firearm in which said projection is adapted to slide, a depression in the said guide into which the projection of the said press-lever may enter, and a hammer, pivotally connected to the fire-arm and adapted to be moved to cocked position by the said press-lever, whereby on the entry of the said projection into the depression of the guide the hammer is released by the press-lever, and spring means acting on said hammer for causing the latter when released from the press-lever to jump forward and fire the cartridge.

2. A gun-lock for automatic fire-arms, comprising in combination, a trigger, a link pivotally connected to the said trigger, a press-lever pivotally connected to the said link, a projection on the press-lever, a guide attached to the fire-arm in which the said projection is adapted to slide, a depression in the said guide into which the projection of the said press-lever may enter, and a spring pressed hammer pivotally connected to the fire-arm and adapted to be moved to cocked position by the said press-lever, whereby on the entry of the said lever-projection into the depression of the guide the hammer is released by the press-lever and caused to jump forward and to fire the cartridge.

3. A gun-lock for automatic fire-arms, comprising in combination, a trigger, a press-lever connected to the said trigger, a hammer pivotally connected to the fire-arm and adapted to be engaged and operated by the said press-lever, a cover-plate located on the fire-arm, an actuating-member pivotally secured to the said cover-plate, the said actuating-member being provided with a projection and a rounded-off extension, whereby on pulling the trigger the said projection is engaged by the hammer and the rounded-off extension slides underneath the said press-lever, lifts the latter and causes an easy and sure disengagement of the press-lever from the hammer.

4. A gun-lock for automatic fire-arms, comprising in combination a trigger, a link pivotally connected to the said trigger, a press-lever pivotally connected to the said link, a hammer pivotally connected to the fire-arm and adapted to be engaged and operated by the said press-lever, a cover-plate located on the fire-arm, an actuating member pivotally secured to the said cover-plate, the said actuating-member being provided with a projection and a rounded-off extension, whereby on pulling the trigger the said projection is engaged by the hammer and the rounded-off extension slides underneath the said press-lever, lifts the latter and causes an easy and sure disengagement of the press-lever from the hammer.

5. A gun-lock for automatic fire-arms, comprising in combination, a trigger, a press-lever connected to the said trigger, a projection on the press-lever, a guide attached to the fire-arm in which the said projection is adapted to slide, a depression in the said guide into which the projection of the said press-lever may enter, a hammer pivotally connected to the fire-arm and adapted to be engaged and operated by the said press-lever, a cover-plate located on the fire-arm, an actuating-member pivotally secured to the said cover-plate, the said actuating member being provided with a projection and a rounded-off extension, whereby on pulling the trigger the projection of the said actuating member is engaged by the hammer and the rounded-off extension slides underneath the said press-lever, lifts the latter, thereby causing the projection of the said press-lever to enter the depression of the said guide and effect an easy and sure disengagement of the press-lever from the hammer.

6. A gun-lock for automatic fire-arms, comprising in combination, a trigger, a link pivotally connected to the said trigger, a press-lever pivotally connected to the said link, a projection on the press-lever, a guide attached to the fire-arm in which the said projection is adapted to slide, a depression in the said guide into which the projection of the said press-lever may enter, a hammer pivotally connected to the fire-arm and adapted to be engaged and operated by the said press-lever, a cover-plate located on the fire-arm, an actuating-member pivotally secured to the said cover-plate, the said actuating-member being provided with a projection and a rounded-off extension, whereby on pulling the trigger the projection of the said actuating-member is engaged by the hammer and the rounded-off extension slides underneath the said press-lever, lifts the latter thereby causing the projection of the said press-lever to enter the depression in the said guide and effect an easy and sure disengagement of the press-lever from the hammer.

In testimony whereof I have hereunto set my hand.

JOSEF DUFFEK.